United States Patent [19]

Kondo et al.

[11] Patent Number: 5,716,140
[45] Date of Patent: Feb. 10, 1998

[54] LINEAR BALL BUSHING

[75] Inventors: Hiromitsu Kondo; Michiyoshi Ishimaru, both of Kuwana, Japan

[73] Assignee: NTN Corporation, Osaka, Japan

[21] Appl. No.: 413,730

[22] Filed: Mar. 30, 1995

[30] Foreign Application Priority Data

Mar. 31, 1994 [JP] Japan ................. 6-063004
Sep. 7, 1994 [JP] Japan ................. 6-213344

[51] Int. Cl.⁶ ........................... F16C 29/04
[52] U.S. Cl. .................................. 384/49
[58] Field of Search ................ 384/49, 30, 48, 384/527, 529

[56] References Cited

U.S. PATENT DOCUMENTS 3,922,037  11/1975  Yamada et al. ............. 384/49
4,664,534  5/1987   Hanaway .................... 384/49

Primary Examiner—Lenard A. Footland
Attorney, Agent, or Firm—Nikaido, Marmelstein, Murray & Oram LLP

[57] ABSTRACT

A linear ball bushing comprises a cylindrical retainer (1) having a number of pockets (1a), a number of balls (2) received in the pockets (1a), respectively, and a retaining sleeve (3) having a number of retaining holes (3a) corresponding to the pockets (1a) in the retainer (1) center (O3) of the retaining hole (3a) being offset by a distance (S) from center O1 of the pocket (1a) axially of the retainer so that a portion of peripheral edge of the retaining hole overhanging the pocket (1a), thereby preventing the balls (2) from dropping out of the pockets (1a).

2 Claims, 3 Drawing Sheets

LINEAR BALL BUSHING

BACKGROUND OF THE INVENTION

1. Field of the Invention

The present invention relates to a linear ball bushing used for supporting a machine element which makes chiefly an axial movement.

2. Prior Art

The use of a linear ball bushing is advantageous in that, because of the use of balls, friction torque associated with repetitive slide and rotative motion of finite stroke is very low as compared with that for a slide bushing or the like.

As shown in FIG. 4, a linear ball bushing comprises a cylindrical retainer 11 having a number of pockets 11a formed therein at suitable intervals, and balls 12 rollably received in the pockets. Generally, it is designed such that the inner diameter is fitted on a machine shaft (or cylindrical inner ring) and the outer diameter is fitted on a machine housing (or cylindrical outer ring); therefore, it is necessary that the balls 12 be assembled such that they will not fall off the pockets 11a of the retainer 11. To this end, the pockets 11a are of two-step shape in which they are smaller at their inner diameter side than the diameter of the balls 12 and larger at their outer diameter side than the diameter of the balls 12. Thus, after the balls 12 have been received respectively in the pockets 11a from the outer diameter side, the outer diameter-associated peripheral edge of the pockets 11a are caulked at suitable places 11b. And in consideration of the operating efficiency in performing such caulking, generally, a copper alloy which is superior in workability to iron-base materials and which facilitates caulking is used for the material of retainers.

In this connection, it is to be noted that since a large number of balls 12 are received in a linear ball bushing, many operating steps are needed for the aforesaid caulking, leading to an increase in cost.

Further, it is necessary to change caulking conditions in accordance with the material, wall thickness and shape of the retainer 11; thus, the regulation of caulking conditions has been very troublesome. Particularly, it is difficult to regulate the amount of caulking. If the amount of caulking is too small, falling-off of balls 12 is expected, while if it is too much, the retainer 11 could be deformed by caulking or caulked portions 11b have sometimes to be post-processed (in order to avoid interfering with a mating member).

Further, for use in vacuum, for example, when it is desired to change the material of the retainer from copper alloy to stainless steel or the like, it is sometimes inevitable to change not only caulking conditions but also peripheral caulking jigs. In the case of use in vacuum, since a lubricant such as grease, cannot be used, how to secure lubrication becomes a problem.

SUMMARY OF THE INVENTION

The present invention has for its object the provision of a linear ball bushing which dispenses with the caulking operation as in the aforesaid linear ball bushing, which effects simplification in terms of process control and quality control, thereby contributing to reduction of cost of linear ball bushings, and which is suitable for use in a special environment where a fluid lubricant cannot be used in vacuum.

The present invention provides a linear ball bushing comprising a cylindrical retainer having a number of pockets, balls rollably received in the pockets of the retainer, and a retaining sleeve which is fitted on the outer diameter of the retainer and which has retaining holes corresponding to the pockets, peripheral edges of the retaining holes partly covering or overhanging the pockets.

Each of the pockets extends through and radially of the retainer. A radially inward end of each pocket is smaller in diameter than the balls.

Further, according to the invention, in the above arrangement, the retainer is made of a material having self-lubricability. As for materials having self-lubricability, use may be made of metals containing a solid lubricant, e.g., lead bronze, and high polymer materials, e.g., polyimide material and PTFE material.

Further, the invention provides a linear ball bushing as described in the above arrangement, wherein the center of each retainer hole is deviated from the center of the associated pocket, so that the peripheral edge of each retaining hole partly overhangs the associated pocket.

Further, the invention provides a method of producing the linear ball bushing, comprising the steps of preparing a cylindrical retainer blank, machining a cylindrical retaining sleeve blank having a machining allowance in the state in which the retaining sleeve blank is fitted on an outer diameter of the cylindrical retainer blank, until a predetermined wall thickness is reached, forming the retaining holes and the pockets at the same time, and moving the retaining sleeve and the retainer relative to each other after the balls have been respectively received in the pockets through the retaining holes.

The movement of the balls, received in the pockets of the retainer, to the outer diameter side is controlled by the peripheral edges of the retaining holes of the retaining sleeve partly overhanging radially outward ends of the pockets of the retainer. Therefore, the caulking operation for preventing balls from falling off as in the prior art is no longer necessary.

The formation of the retainer from a material having self-lubricability reduces friction force in the regions of contact with balls and since filmy deposits of the lubricating component transferred from the retainer are formed, satisfactory lubricating conditions are maintained for a long time.

The machining of a retaining sleeve blank having a machining allowance is effected in the state in which the retaining sleeve blank is fitted on the outer diameter of a retainer blank, thereby making it possible to avoid deformation during processing and deformation during press-fitting on the retainer. Further, simultaneous formation, as by drilling, of pockets in the retainer and retaining holes in the retaining sleeve not only simplifies the process but also makes it possible to avoid deformation during drilling even when the retaining sleeve is thin-walled, and furthermore required precision of drilling can be secured.

Embodiments of the invention will now be described.

DESCRIPTION OF THE PREFERRED EMBODIMENTS

Figure 1A:
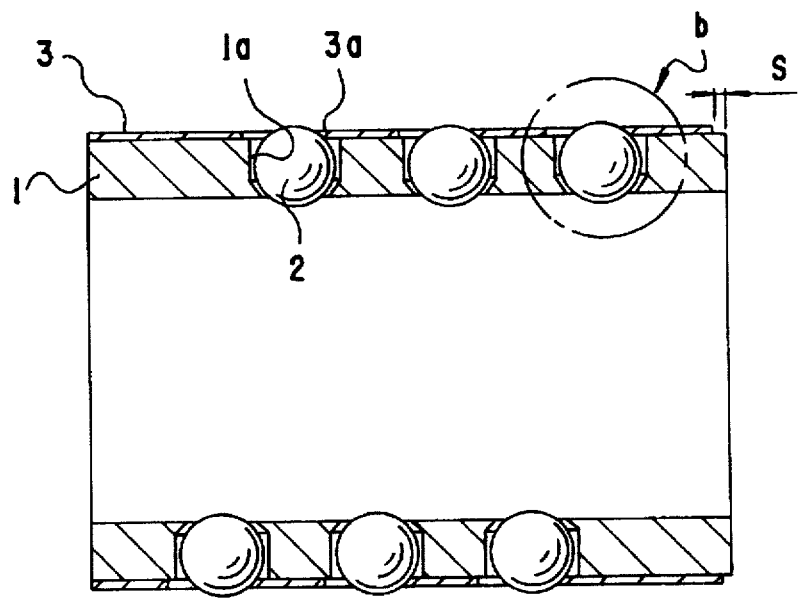
FIG. 1A is a longitudinal sectional view of a linear ball bushing according to an embodiment of the present invention.

A linear ball bushing shown in FIG. 1A comprises a cylindrical retainer 1 having a number of pockets 1a formed therein at suitable intervals, balls 2 rollably received in the pockets 1a of the retainer 1, and a retaining sleeve 3 fitted on the outer diameter of the retainer 1. As shown enlarged in FIG. 1B, the pocket 1a in the retainer 1 is of two-step shape in which the diameter D1 on the inner diameter side is smaller than the diameter D0 of the ball 2 and the diameter D2 on the outer diameter side is larger than the diameter D0 of the ball 2. However, unlike the pockets shown in FIG. 4B, it is not caulked. Therefore, before the retaining sleeve 3 is fitted in position, the balls 2 are restricted by the pockets 1a from moving toward the inner diameter side but not toward the outer diameter side.

The retaining sleeve 3 has a number of retaining holes 3a corresponding to the pockets 1a of the retainer 1. In this embodiment, the retaining hole 3a is of the same diameter as the pocket 1a, but its center O3 is axially offset by a distance S from the center O1 of the pocket 1a, part of its peripheral edge covering part of the pocket 1a from the outer diameter side. For this reason, movement of the ball 2 received in the pocket 1a toward the outer diameter side is restricted by part of the peripheral edge covering the pocket 1a of the retaining bolt 3a. Therefore, the movements of the ball 2 toward the inner and outer diameter sides are restricted, respectively, by the inner diameter side of the pocket 1a and part of the peripheral edge of the retaining hole 3a, thereby effecting prevention of falling-off from the retainer 1.

As described above, the linear ball bushing in this embodiment is designed such that the ball 2 is retained by the deviation between the pocket 1a in the retainer 1 and the retaining hole 3a in the retaining sleeve fitted on the outer diameter of the retainer 1. Therefore, the caulking operation for preventing the ball from falling off as in the prior art is no longer necessary. For this reason, as compared with the prior art, the number of manhours can be reduced to a great degree in that the operation for retaining a number of balls can be effected at once, a fact which is advantageous from the standpoint of process control. Furthermore, there is no need to worry about any deformation of the retainer owing to caulking or about an excessive amount of caulking that can cause interference with a mating member, nor is the need to effect post-processing for caulked portions, a fact which is advantageous from the standpoint of quality control.

If the retainer 1 and retaining sleeve 3 of this linear ball bushing are made of stainless steel or the like, use in vacuum becomes possible, and since it is no longer necessary to regulate caulking conditions as in the prior art, change of material can be easily carried out. In this case, if the surfaces of the balls 2 are formed with solid lubricating films of crystalline PTFE material, durability in vacuum can be improved as compared with untreated articles. Further, the formation of the balls 2 from ceramic material ensures that even if the solid lubricating films deteriorate, seizing can be avoided since the contact with a mating member (usually, iron-base material) is of contact between dissimilar materials; thus, the accident in which the balls suddenly become unable to rotate can be avoided.

In the case of an operation under load conditions subject to moment load, rows of balls in the vicinity of the shaft center are removed and rows of balls adjacent opposite ends are employed to support moment load, which arrangement makes it possible to secure optimum operating conditions for a long time.

This linear ball bushing is produced for example through the following steps.

(1) First, a cylindrical blank (retaining sleeve blank) whose wall is thicker by an amount corresponding to a machining allowance is press-fitted on the outer diameter of a cylindrical blank (retainer blank) which is to become a retainer 1 and the outer diameter of the retaining sleeve blank is cut until a required wall thickness is attained. Depending upon the glaze of the linear ball bushing, the retaining sleeve 3 has to be finished to have a considerably thin wall. However, the cutting operation in this state in which the thick-walled retaining sleeve blank is fitted on the outer diameter of the retainer blank makes it possible to avoid deformation during processing and deformation during press-fitting onto the retainer 1. Further, there is no need to prepare special jigs or the like for the processing of thin-walled cylindrical members and, furthermore, the process is easy.

Figure 1B:
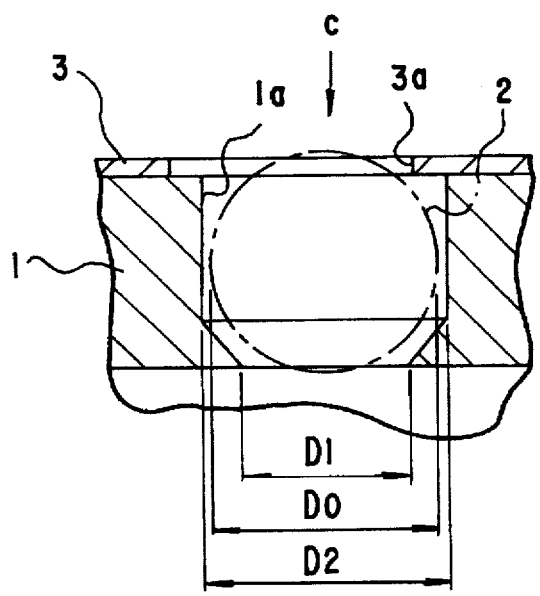
FIG. 1B is an enlarged view of an area b in FIG. 1A.

(2) Then, the pockets 1a of the retainer 1 and the retaining holes 3a of the retaining sleeve 3 are simultaneously drilled. Therefore, the pockets 1a and the retaining holes 3a are of the same diameter, and at this point of time, their centers O1 and O3 are aligned. Thus, simultaneously drilling the pockets 1a and retaining holes 3a in this manner makes it possible not only to simplify the processing but also to avoid deformation during drilling in the case where the retaining sleeve 3 is thin-walled and to secure required precision of drilling. In addition, pockets 1a of two-step shape as shown in FIG. 1b can be processed at a stroke by positioning the front end of processing tool such as drill.

(3) And after the balls 2 have been received in the pockets 1a through the retaining holes 3a from the outer diameter side, the retaining sleeve 3 is axially moved by a predetermined amount S relative to the retainer 1. This amount of relative movement S determines the amount of offset S between the center O3 of the retaining holes 3a and the center O1 of the pockets 1a. The amount of offset S may be optionally determined in accordance with the material, wall-thickness, required retention force and so on of the retaining sleeve and can be simply changed by changing the amount of relative movement S. In this embodiment, allowing for the amount of relative movement S, the axial length of the retaining sleeve 3 is less by the dimension S than the axial length of the retainer 1. In addition, the relative movement between the retaining sleeve 3 and the retainer 1 may be not only axial but also peripheral or both axial and peripheral. Further, if a suitable interference is provided between the retainer 1 and the retaining sleeve 3, this is sufficient to ensure for ordinary use, but further safety can be attained if the two members are fixed to either after relative movement by suitable fixing means such as caulking or welding (spot welding). Further, the described order of processing for the cutting (1) and the drilling (2) may be reversed. That is, after the pockets 1a and the retaining holes 3a have been drilled, the outer diameter of the retaining sleeve blank may be cut until a predetermined wall thickness is attained.

In the case where the wall thickness of the retaining sleeve 3 can be secured to the extent that it prevents deformation of the retaining sleeve during the drilling of the retaining holes 3a and during press-fitting on the retainer 1, the retaining sleeve 3 and retainer 1 may be separately finished, in which case after the retaining sleeve 3 has been fitted on the outer diameter of the retainer 1, the pockets 1a and the retaining holes 3a will be drilled or before the retaining sleeve 3 is fitted on the outer diameter of the retainer 1, the drilling of the pockets 1a and the retaining holes 3a may be effected separately. In the latter case, the fitting operation is effected preferably such that a predetermined amount of offset is created between the center O3 of the retaining hole 3a and the center O1 of the pocket 1a.

Figure 2:
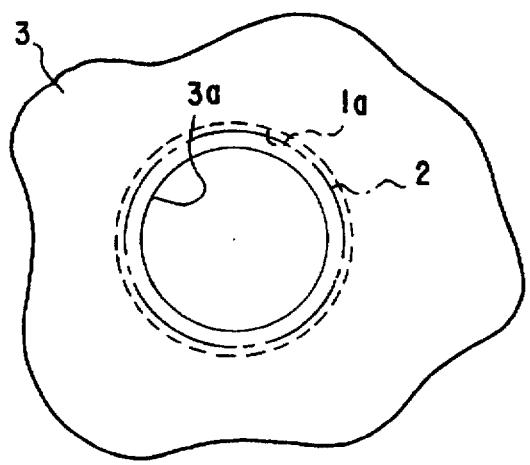
FIG. 2 is a fragmentary plan view, taken from the outer diameter side, of a portion around a pocket and a retaining hole in a linear ball bushing according to another embodiment of the invention.
Figure 3:
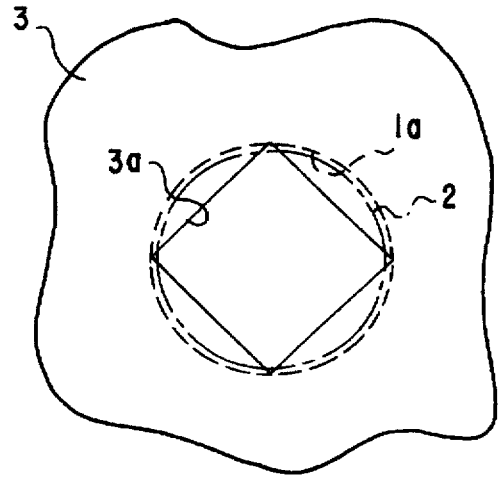
FIG. 3 is a fragmentary plan view, taken from the outer diameter side, of a portion around a pocket and a retaining hole in a linear ball bushing according to another embodiment of the invention.

However, in the case of separately effecting the drilling of the pockets 1a and the retaining holes 3a as described above, it is not always necessary to offset the two centers relative to each other. For example, making the retaining holes 3a smaller in diameter than the pockets 1a as shown in FIG. 2 or making the retaining holes 3a polygonal (in the figure, quadrangular) as shown in FIG. 3 will also provides the effect of preventing falling-off of the balls 2. In the case where the retaining holes 3a are made smaller in diameter than the pocket 1a (in the case of FIG. 2), falling-off of the ball 2 is prevented by the entire periphery of the retaining hole 3a which covers part of the pocket 1a.

Figure 5:
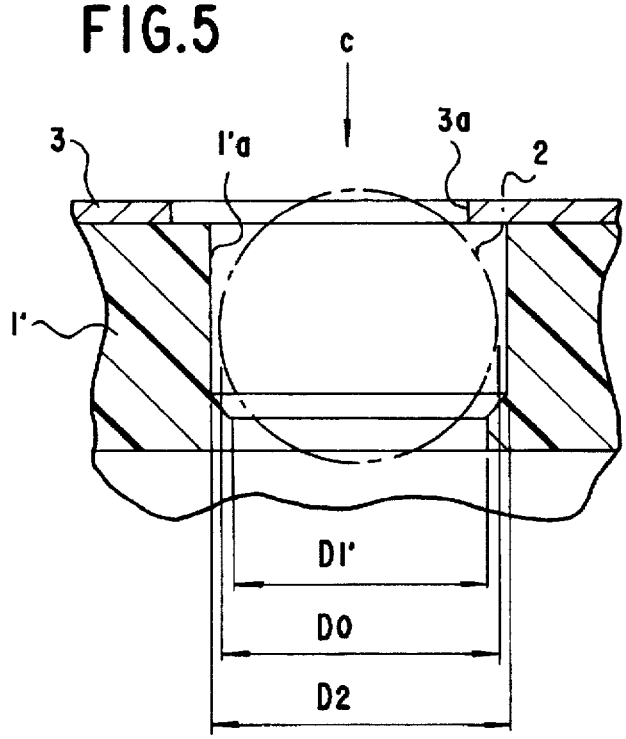
FIG. 5 is an enlarged sectional view showing a portion around a pocket in a retainer according to another embodiment of the invention.

In an embodiment shown in FIG. 5, the retainer 1' is made or a material having self-lubricability, e.g., polyimide material (SP-1 or the like produced by Du Pont (E.I) de Nemours & Co.). When it is used in vacuum, it is preferable to form the balls 2 from martensitic stainless steel and the retaining sleeve 8 from stainless steel. Forming the retainer 1' from polyimide material reduces friction force in the regions of contact between the pockets 1' and the balls 2 and since filmy deposits of polyimide are formed on the surfaces of the balls 2, a satisfactory lubricating condition is maintained for long time without requiring any special lubricating agent. Therefore, the linear ball bushing of this embodiment, even in a special environment in vacuum which prohibits using a fluid lubricant, develops high durability. Of course, an arrangement may additionally be employed in which solid lubricating films (of crystalline PTFE or the like) are formed on the surfaces of the balls 2. Some operating time has to be expended before the filmy deposits of polyimide can be sufficiently formed on the surfaces of the balls 2. However, by forming solid lubricating films on the surface of the balls 2 in advance, satisfactory lubrication is obtained from the early period of operation. On the other hand, since the component necessary for the formation of the filmy deposite of polyimide is continuously supplied from the retainer 1' (the filmy deposits are formed in that lubricating debris of polyimide scraped off the wall surfaces of the pockets 1' a by contact between the retainer 1' and the balls 2 are transferred to the surfaces of the balls 2 and to the contact surface of the mating member), the lubricating property and durability are improved to a surprising degree as compared with the arrangement in which solid lubricating films alone are formed on the surfaces of the balls 2.

Further, the linear ball bushing in this embodiment can be used in special environment such as vacuum and it can also be used together with a lubricant such as grease in an ordinary environment in which case the lubricating property and durability are greatly improved to a surprising degree as compared with the conventional arrangement.

Further, forming the retainer 1' from polyimide material reduces the friction force produced in press-fitting the retaining sleeve 3; thus, there is an advantage that even when the retaining sleeve 3 is finished to the final wall thickness and then is to be press-fitted in this thin-walled state, the press-fitting can be easily performed.

Figure 1C:
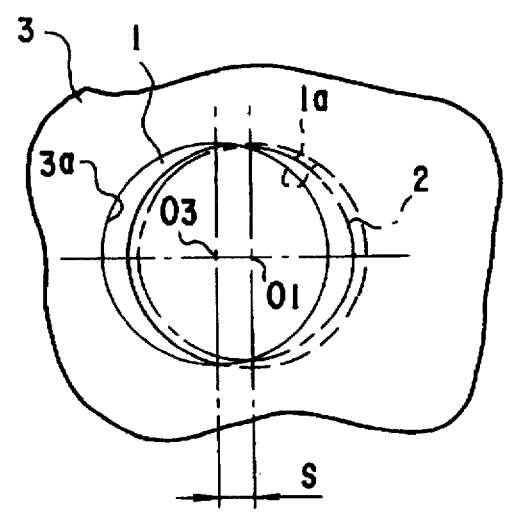
FIG. 1C is a view taken in the direction of arrow c in FIG. 1B.
Figure 4A:
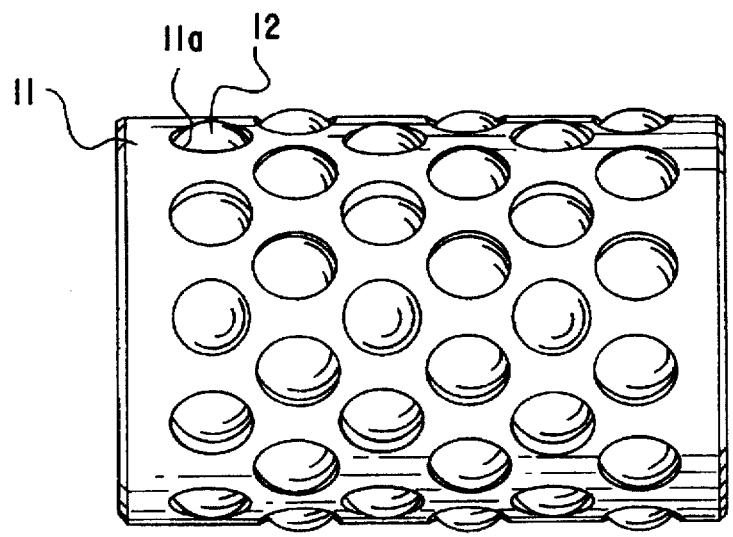
FIG. 4A is a side view of a conventional linear ball bushing.
Figure 4B:
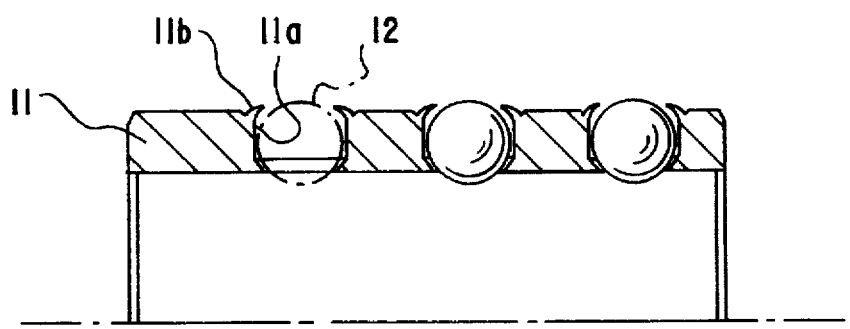
FIG. 4B is a longitudinal sectional view of the linear ball bushing shown in FIG. 4A.

As shown in FIG. 5, in this embodiment, the pockets 1'a of the retainer 1' are of three-step shape, the intention being to increase the wall thickness of the diameter D1' portion on the inner diameter side as compared with the pockets 1a of two-step shape in FIGS. 1B and 4B so as to prevent chipping off of that portion. The pockets 1'a of such three-step shape can be formed by drilling either simultaneously with the formation of the retainer 1' (in the case where the retainer 1' is injection molded) or after the formation of the retainer 1' by using a drill or the like. In addition, the pockets 1a of the retainer 1 in FIG. 1 may be formed in such three-step shape.

As for the material of the retainer 1', besides polyimide use may be made with high polymer materials such as PTFE materials (e.g. BEAREE 3800 of NTN Engineering Plastics Corporation), and metallic materials having self-lubricability such as lead bronze, in which case also the same effects as above can be attained.

As has been described so far, the linear ball bushing of the present invention is designed such that the balls are retained by the peripheral edges (part or whole of the peripheral edges) of the retaining holes in the retaining sleeve fitted on the outer diameter of the retainer; therefore, caulking operation for prevention of the falling-off of the balls as in the prior art is no longer necessary. For this reason, as compared with the prior art, the number of manhours can be reduced to a great degree in that the operation for retaining a number of balls can be effected at once, a fact which is advantageous from the standpoint of process control. Furthermore, there is no need to worry about causing deformation of the retainer due to caulking and interference with a mating member due to an excessive amount of caulking in the caulked portion, nor is there need to effect post-processing for caulked portions, a fact which is advantageous from the standpoint of quality control.

Further, forming the retainer from a material having self-lubricability reduces the friction force in the regions of contact with the balls, and since the filmy deposits of the lubricating component from the retainer are formed on the surfaces of the balls, a satisfactory lubricating condition is maintained for a longtime. For this reason, the durability in a special environment such as vacuum as well as in an ordinary environment is improved to a surprising degree.

Machining in the state in which a retaining sleeve blank having a machining allowance is fitted on the outer diameter of the retainer blank makes it possible to avoid deformation during processing and deformation during fitting on the retainer even if the retaining sleeve has a thin wall. There is no need to prepare a special jig for processing a thin-walled cylindrical sleeve and, furthermore, the processing is easy. Further, simultaneously drilling the pockets in the retainer and the retaining holes in the retaining sleeve makes it possible not only to simplify the processing but also to avoid deformation during drilling in the case where the retaining sleeve is thin-walled and to secure required precision of drilling. And a ball-falling-off preventing function such as one described above can be provided simply by moving the retainer and the retaining sleeve relative to each other after processing.

With the above effects thus achieved, the present invention contributes to cost reduction in linear ball bushings.

What is claimed is:

1. A linear ball bushing comprising a cylindrical retainer having a number of pockets, balls rollably received in said pockets of said retainer, and a retaining sleeve which is fitted on an outer diameter of said retainer and which has retaining holes corresponding to said pockets, peripheral edges of said retaining holes partly covering said pockets, and wherein the center of each retaining hole is offset from the center of the associated pocket.

2. The linear ball bushing as set forth in claim 1, wherein each of said pockets extends through and radially of said retainer, a radially inward end of each of said pockets being smaller in diameter than said balls.

* * * * *